(12) United States Patent
Ebata et al.

(10) Patent No.: US 12,027,285 B2
(45) Date of Patent: Jul. 2, 2024

(54) WIRING MEMBER WITH FIXING MEMBER, AND FIXING STRUCTURE OF WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Daisuke Ebata, Mie (JP); Ryuta Takakura, Mie (JP); Taku Umehara, Mie (JP); Tetsuya Nishimura, Mie (JP); Kenta Arai, Mie (JP); Miyu Aramaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 365 days.

(21) Appl. No.: 17/434,891

(22) PCT Filed: Mar. 6, 2019

(86) PCT No.: PCT/JP2019/008762
§ 371 (c)(1),
(2) Date: Aug. 30, 2021

(87) PCT Pub. No.: WO2020/178999
PCT Pub. Date: Sep. 10, 2020

(65) Prior Publication Data
US 2022/0059253 A1    Feb. 24, 2022

(51) Int. Cl.
*H01B 7/08* (2006.01)
*H01B 7/40* (2006.01)
*H02G 3/32* (2006.01)

(52) U.S. Cl.
CPC .............. *H01B 7/08* (2013.01); *H01B 7/40* (2013.01)

(58) Field of Classification Search
CPC ... B60R 16/0215; B60R 16/0207; H01B 7/08; H01B 7/40; H01B 7/0846; H01B 3/32
See application file for complete search history.

(56) References Cited

U.S. PATENT DOCUMENTS

| | | |
|---|---|---|
| 4,918,261 A | 4/1990 | Takahashi et al. |
| 5,160,812 A | 11/1992 | Takahashi et al. |

(Continued)

FOREIGN PATENT DOCUMENTS

| | | |
|---|---|---|
| CN | 107210093 | 9/2017 |
| JP | 58-140676 | 9/1983 |

(Continued)

OTHER PUBLICATIONS

Office Action issued in Corresponding CN Patent Application No. 201980093199.8, dated Sep. 13, 2022, along with an English translation thereof.

(Continued)

*Primary Examiner* — Hoa C Nguyen
*Assistant Examiner* — Amol H Patel
(74) *Attorney, Agent, or Firm* — GREENBLUM & BERNSTEIN, P.L.C.

(57) ABSTRACT

A wiring member with a fixing member includes a flat wiring member, and a fixing member. The flat wiring member includes a plurality of wire-like transmission members and a base material. The plurality of wire-like transmission members are fixed to the base material in an arrayed state. The fixing member includes a plate-like part and a fixing part. The plate-like part is formed into a plate-like shape elongated in one direction, and the plate-like part is attached to the base material while a main surface of the (Continued)

plate-like part comes in surface contact with the base material. The fixing part is a part being provided to project on the plate-like part and being configured to fix the flat wiring member to a fixing target.

4 Claims, 8 Drawing Sheets

(56) References Cited

U.S. PATENT DOCUMENTS

| | | | |
|---|---|---|---|
| 10,759,360 B2 | 9/2020 | Mizuno et al. | |
| 10,867,721 B2 | 12/2020 | Ishida et al. | |
| 2013/0292159 A1* | 11/2013 | Gotou | H02G 3/0487 174/250 |
| 2015/0048221 A1* | 2/2015 | Doushita | B60R 16/0215 248/71 |
| 2017/0361788 A1 | 12/2017 | Itou | |
| 2020/0141518 A1 | 5/2020 | Nakano et al. | |

FOREIGN PATENT DOCUMENTS

| | | |
|---|---|---|
| JP | 62-290304 | 12/1987 |
| JP | 07-023885 | 5/1995 |
| JP | 11-273460 | 10/1999 |
| JP | 2006-34043 | 2/2006 |
| JP | 2011-149456 | 8/2011 |
| JP | 2018-137208 | 8/2018 |
| JP | 2018-191472 | 11/2018 |
| JP | 2019-004679 | 1/2019 |

OTHER PUBLICATIONS

Office Action issued in Corresponding CN Patent Application No. 201980093199.8, dated Apr. 1, 2023, along with an English translation thereof.

International Search Report issued in International Pat. Appl. No. PCT/JP2019/008762, dated May 21, 2019, along with an English translation thereof.

Office Action issued in Corresponding JP Patent Application No. 2019-162849, dated Dec. 13, 2022, along with an English translation thereof.

Office Action issued in Corresponding JP Patent Application No. 2019-162849, dated Jul. 18, 2023, along with an English translation thereof.

* cited by examiner

WIRING MEMBER WITH FIXING MEMBER, AND FIXING STRUCTURE OF WIRING MEMBER

TECHNICAL FIELD

The present disclosure relates to a wiring member with a fixing member and a fixing structure of the wiring member.

BACKGROUND ART

Patent Document 1 discloses a wire harness. The wire harness includes a functional exterior member funned into a sheet-like shape, and an electric wire disposed to overlap the functional exterior member in at least a part of a region along a longitudinal direction. At least a portion of a part in which an insulation covering of the electric wire and the functional exterior member overlap is welded.

PRIOR ART DOCUMENTS

Patent Documents

Patent Document 1: Japanese Patent Application Laid-Open No. 2018-137208
Patent Document 2: Japanese Patent Application Laid-Open No. 2011-149456

SUMMARY

Problem to be Solved by the Invention

It is desirable that, in the wire harness described in Patent Document 1, the wire harness be able to maintain its spread state to the extent possible in a state of being fixed to the fixing target.

In view of this, an object is to provide technology that enables a flat wiring member to maintain its spread state to the extent possible in a state of being fixed to a fixing target.

Means to Solve the Problem

A wiring member with a fixing member according to the present disclosure is a wiring member with a fixing member that includes a flat wiring member, and a fixing member. The flat wiring member includes a plurality of wire-like transmission members and a base material. The plurality of wire-like transmission members are fixed to the base material in an arrayed state. The fixing member includes a plate-like part and a fixing part. The plate-like part is formed into a plate-like shape elongated in one direction, and the plate-like part is attached to the base material while a main surface of the plate-like part comes in surface contact with the base material. The fixing part is a part being provided to project on the plate-like part and being configured to fix the flat wiring member to a fixing target.

Effects of the Invention

According to the present disclosure, the flat wiring member can maintain its spread state to the extent possible in a state of being fixed to the fixing target.

DESCRIPTION OF EMBODIMENTS

Description of Embodiments of Present Disclosure

Figure 1:
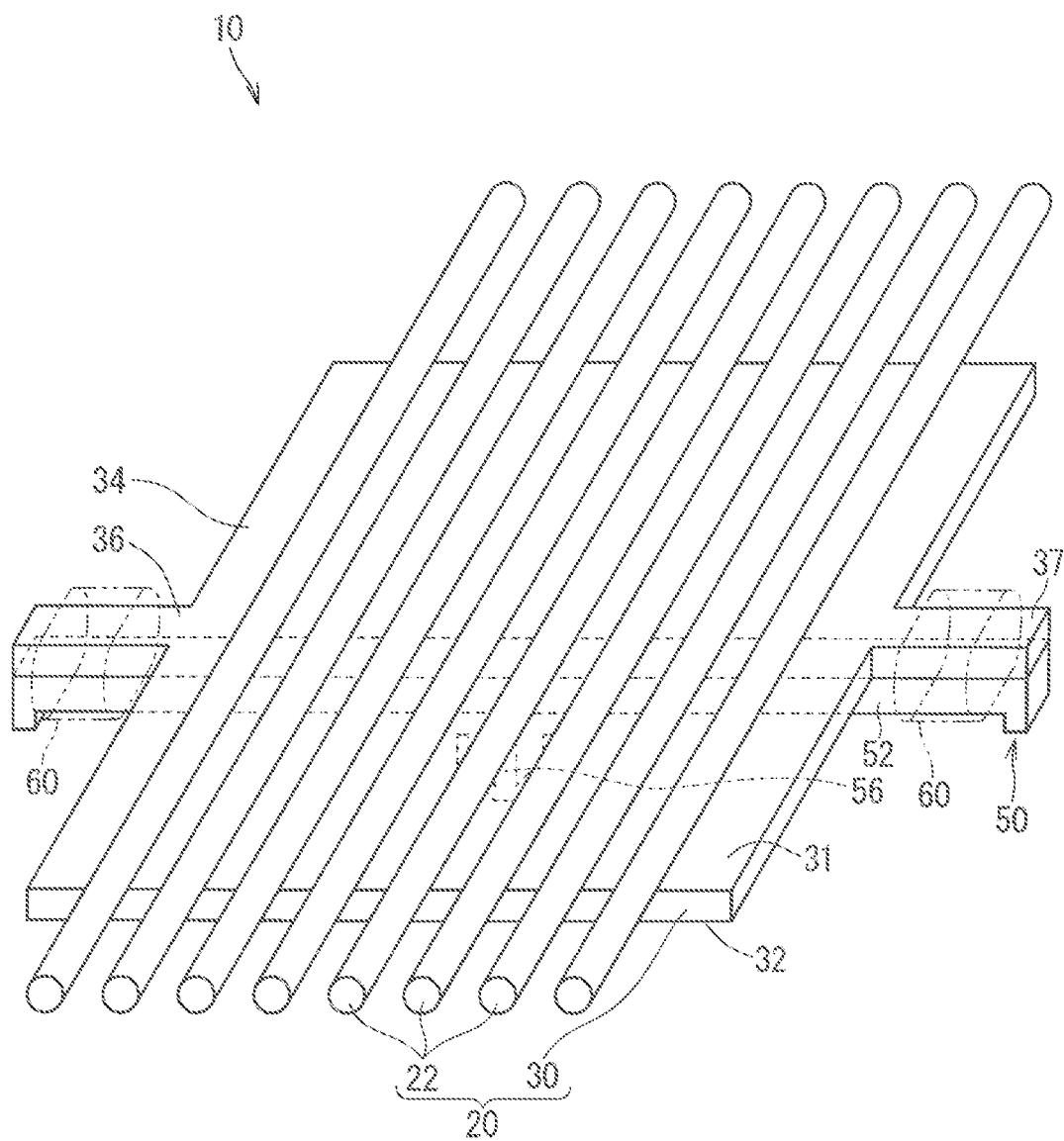
FIG. 1 is a perspective view illustrating a wiring member with a fixing member according to the first embodiment.

First, embodiments of the present disclosure will be listed below.

A wiring member with a fixing member according to the present disclosure is as follows.

(1) A wiring member with a fixing member includes a flat wiring member, and a fixing member. The flat wiring member includes a plurality of wire-like transmission members and a base material. The plurality of wire-like transmission members are fixed to the base material in an arrayed state. The fixing member includes a plate-like part and a fixing part. The plate-like part is formed into a plate-like shape elongated in one direction, and the plate-like part is attached to the base material while a main surface of the plate-like part comes in surface contact with the base material. The fixing part is a part being provided to project on the plate-like part and being configured to fix the flat wiring member to a fixing target.

The plate-like part is attached to the base material while the main surface of the plate-like part in the fixing member comes in surface contact with the base material, and thus the flat wiring member can maintain its spread state to the extent possible in a state in which the fixing member is attached. When the fixing member is fixed to the fixing target in this state, the flat wiring member can maintain its spread state to the extent possible in a state of being fixed to the fixing target.

Here, the wire-like transmission member is a wire-like member that transmits electrical power, light, or the like.

(2) The plate-like part may extend in a direction in which the plurality of wire-like transmission members are arrayed. In this case, owing to the plate-like part, the flat wiring member can maintain its spread state to the extent possible in the direction in which the plurality of wire-like transmission members are arrayed.

(3) The plate-like part may extend in a direction in which the plurality of wire-like transmission members extend. In this case, owing to the plate-like part, the flat wiring member can maintain its spread state to the extent possible in the direction in which the plurality of wire-like transmission members extend.

(4) A bundling member may be further included. The base material may include a body part, and an extension piece extending from the body part. The plurality of wire-like transmission members may be fixed to the body part. The plate-like part and the extension piece may be bundled by the bundling member. In this case, the wire-like transmission members can be prevented from being bundled by the bundling member in a state in which the fixing member is attached to the base material.

(5) The fixing member may be attached to the base material with the plate-like part being inserted into an insertion hole formed in the base material. In this case, a state in which the plate-like part is attached to the base material while coming in surface contact with the base material can be easily generated.

(6) The base material may include a body part, and a folded piece extending from the body part. The plurality of wire-like transmission members may be fixed to the body part. The fixing member may be attached to the folded piece. The folded piece may be folded toward a side of the body part together with the fixing member. In this case, the direction of the fixing part can be changed.

(7) The extension piece may be maintained in a folded state with the plate-like part penetrating a through hole formed in the body part. In this case, a member for maintaining the folded shape need not be separately provided.

(8) The extension piece may be maintained in a folded state with the fixing part penetrating a through hole formed in the body part. In this case, a member for maintaining the folded shape need not be separately provided.

(9) Further, fixing structure of a wiring member according to the present disclosure is a fixing structure of a wiring member that includes a flat wiring member, a fixing target, and a fixing member. The flat wiring member includes a plurality of wire-like transmission members and a base material. The plurality of wire-like transmission members are fixed to the base material in an arrayed state. The fixing member includes a fixing part and a plate-like part. The fixing part is fixed to a fixing hole formed in the fixing target while penetrating a through hole formed in the base material. The plate-like part is formed into a plate-like shape spreading from a base end portion of the fixing part, and presses the base material toward the fixing target while coming in surface contact with the base material. The plate-like part presses the base material toward the fixing target while corning in surface contact with the base material, and thus the flat wiring member can maintain its spread state to the extent possible in a state of being fixed to the fixing target.

DETAILS OF EMBODIMENTS OF PRESENT DISCLOSURE

Specific examples of a wiring member with a fixing member according to the present disclosure will be described below with reference to the drawings. Note that the present invention is not limited to these examples hut is recited in the claims, and encompasses meanings equivalent to those of the claims and all modifications within the scope of the claims.

First Embodiment

Figure 2:
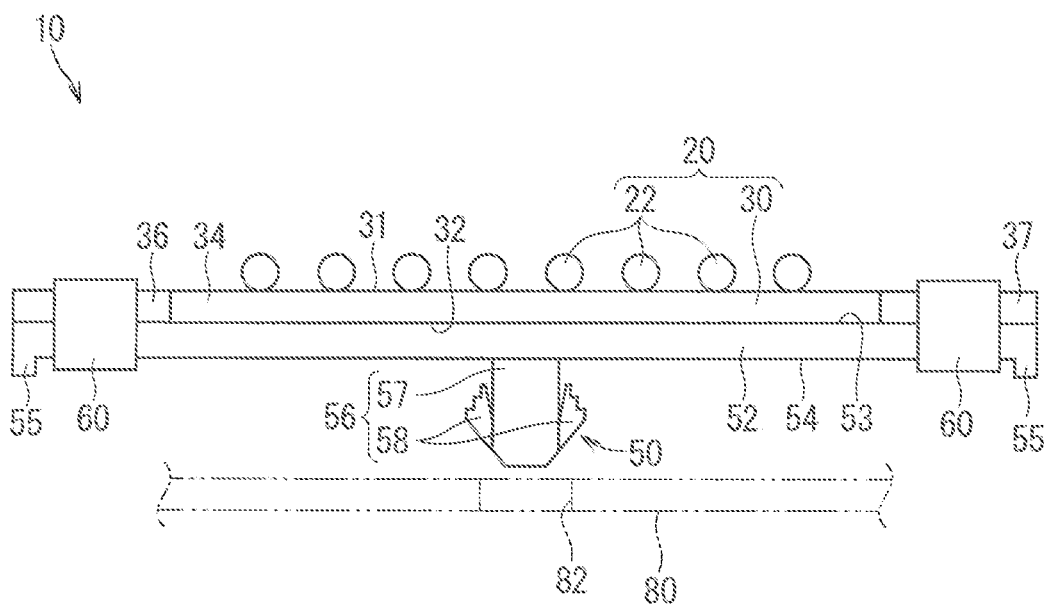
FIG. 2 is a front view illustrating the wiring member with a fixing member according to the first embodiment.

A wiring member with a fixing member according to the first embodiment will be described below. FIG. 1 is a perspective view illustrating a wiring member with a fixing member 10 according to the first embodiment. FIG. 2 is a front view illustrating the wiring member with a fixing member 10 according to the first embodiment.

The wiring member with a fixing member 10 includes a flat wiring member 20 and a fixing member 50. The wiring member with a fixing member 10 according to the present example further includes bundling members 60.

The flat wiring member 20 is a member that is mounted on a vehicle, and that supplies electrical power to each device of the vehicle and transmits and receives signals. The flat wiring member 20 has its dimension in the thickness direction being formed smaller than the dimension in a direction perpendicular to the thickness direction. The flat wiring member 20 includes a plurality of wire-like transmission members 22, and a base material 30 that is fixed in a state in which the plurality of wire-like transmission members 22 are arrayed.

It is only necessary that the wire-like transmission member 22 is a wire-like member that transmits electrical power or light. For example, the wire-like transmission member 22 may be a general wire having a core wire and a covering around the core wire, or may also be a bare conductive wire, a shielded wire, an enamel wire, a nichrorne wire, or an optical fiber.

The wire-like transmission member 22 transmitting the electrical power may be various kinds of signal lines or various kinds of power lines. The wire-like transmission member 22 transmitting the electrical power may be used as an antenna or coil, for example, transmitting or receiving a signal or electrical power to or from a space.

The wire-like transmission member 22 includes a transmission wire body that transmits electrical power, light, or the like, and a covering that covers the transmission wire body. When the wire-like transmission member 22 is a general wire, the transmission wire body is a core wire, and the covering is an insulation covering. In the example illustrated in FIG. 2, a plurality of wire-like transmission members 22 having the same diameter and structure are disposed on one base material 30. However it is only necessary that the diameter, structure, or the like of the plurality of wire-like transmission members 22 be set as appropriate, and the wire-like transmission members 22 having different diameters, structures, or the like may be disposed on the same base material 30.

The wire-like transmission member 22 may be a single wire-like material, or may be a composite of a plurality of wire-like materials (twist wire, a cable in which a plurality of wire-like materials are collected and then covered by a sheath, or the like). At an end portion of the wire-like transmission member 22, a terminal, a connector, or the like is provided as appropriate, according to a mode of connecting with a member to be connected with the wire-like transmission member 22.

The base material 30 holds the plurality of wire-like transmission members 22 in an arrayed state. Here, the base material 30 is a sheet-like member that is formed separately from the wire-like transmission members 22. The wire-like transmission members 22 are disposed along a predetermined route on a main surface of the base material 30 being formed into a sheet-like shape. In the following, in the base material 30, one main surface to which the wire-like transmission members 22 are fixed is referred to as a main surface 31, and another main surface on the opposite side of the main surface 31 is referred to as a main surface 32. It can also be interpreted that the wire-like transmission members 22 are held in a state that is two-dimensionally positioned on the base material 30.

The base material 30 includes a body part 34 on which the wire-like transmission members 22 are disposed, and extension pieces 36 and 37 that extend from the body part 34. On the extension pieces 36 and 37, the wire-like transmission members 22 are not disposed. The extension piece 36 extends toward one side with respect to the body part 34, and the extension piece 37 extends toward another side with respect to the body part 34. Here, the extension pieces 36 and 37 are each faired into a band-like shape smaller than the body part 34. The fixing member 50 is attached using the extension pieces 36 and 37.

Although the material constituting the base material 30 is not particularly limited, the base material 30 is, for example, made of a material containing resin such as polyvinyl chloride (PVC), polyethylene terephthalate (PET), and polypropylene (PP). The base material 30 may be, for example, a fiber material including fibers, such as nonwoven fabrics, a cloth, and knitted fabrics, or may be a non-fiber material. The non-fiber material may include a solid member whose inside is uniformly filled, a foamed material that is made of resin being foamed, or the like. The base material 30 may include a material such as metal.

The base material 30 may be a single layer, or may have a plurality of layers being stacked. When a plurality of layers are stacked, for example, it is considered that a resin layer and another resin layer are stacked. Alternatively, for example, it is considered that a resin layer and a metal layer are stacked. Further, the base material 30 may be a material in which a non-fiber material layer and another non-fiber material layer are placed on one another, may be a material in which a non-fiber material layer and a fiber material layer are placed on one another, or may be a material in which a fiber material layer and another fiber material layer are placed on one another.

The base material 30 may be a bendable member, may be a member having such rigidity as to allow the base material 30 to curve and hold the plurality of wire-like transmission members 22 in a state of being planarly positioned, or may be a member having such rigidity as to allow the base material 30 to hold the plurality of wire-like transmission members 22 in a state of being two-dimensionally positioned in a state of maintaining its flat state. The base material 30 may include a part having a three-dimensional shape, such as a partially formed upright wall.

The body part 34 of the base material 30 is formed into a band-like shape that extends along the route of the wire-like transmission members 22. It is only necessary that the route of the wire-like transmission members 22 on the base material 30 be set as appropriate, and in the example illustrated in FIG. 1, the wire-like transmission members 22 have a part that is linearly disposed on the base material 30. The extension pieces 36 and 37 are provided on sides of the body part 34 at the part where the wire-like transmission members 22 are linearly disposed.

The wire-like transmission members 22 may include a part being bent and disposed on the base material 30. In this case, the base material 30 may also be formed to be bent along the main surface 31 in accordance with the bending of the wire-like transmission members 22. The plurality of wire-like transmission members 22 may be disposed in different routes, such as in a manner of branching or crossing on the base material 30. In this case, the base material 30 may also be formed so as to branch or cross. With the base material 30 being formed into a shape along the route of the plurality of wire-like transmission members 22, interference between the base material 30 and other components can be reduced, and weight can be reduced, for example.

The wire-like transmission members 22 and the base material 30 are fixed. As the fixing means, contact area fixation may be used, non-contact area fixation may be used, or both of them may be used at the same time. Here, the contact area fixation is a mode in which the wire-like transmission members 22 and the base material 30 are fixed to each other with their contact part coming in contact with each other. Further, the non-contact area fixation is a fixing mode different from the contact area fixation. For example, the non-contact area fixation is a mode to maintain the wire-like transmission members 22 and the base material 30 in a state of being fixed to each other. This mode is obtained as follows, for example: a thread, another base material, an adhesive tape, or the like presses the wire-like transmission members 22 down toward the base material 30, or a thread, another base material, an adhesive tape, or the like surrounds the wire-like transmission members 22 and the base material 30, for example, so as to interpose the wire-like transmission members 22 and the base material 30. The following description will be given based on the assumption that the wire-like transmission members 22 and the base material 30 are in a state of the contact area fixation. Each description related to the contact area fixation can also be applied to the non-contact area fixation, unless the application is impossible.

As a mode of the contact area fixation, indirect fixation may be used, direct fixation may be used, or both of them may be used at the same time in different regions. Here, the indirect fixation is a mode in which the wire-like transmission members 22 and the base material 30 are fixed to each other by being indirectly coming in contact via an intermediation material being provided therebetween, such as an adhesive agent, a pressure sensitive adhesive, a double-sided adhesive tape, and a hook-and-loop fastener. Further, the direct fixation is a mode in which the wire-like transmission members 22 and the base material 30 are fixed to each other by being directly coming in contact without the use of a material being separately provided, such as an adhesive agent. In the direct fixation, for example, it is considered that the wire-like transmission members 22 and the base material 30 are fixed by coming in contact with resin included in at least one of those being melted. The following description will be given based on the assumption that the wire-like transmission members 22 and the base material 30 are in a state of the direct fixation. Each description related to the direct fixation can also be applied to the indirect fixation, unless the application is impossible.

In forming the state of such a direct fixation, the resin is considered to be melted by heat or a solvent, for example. That is to say, the state of the direct fixation may be the state of the direct fixation by the heat or the state of the direct fixation by the solvent. The direct fixation by the heat is preferable.

At this time, a means of forming the state of the direct fixation is not particularly limited, but various means including, a known means such as welding, fusion, and melting joint can be used. For example, when the state of the direct fixation by the heat is formed by welding, various welding means such as ultrasonic welding, heating-pressurizing welding, hot air welding, and high frequency welding can be adopted. Further, when the state of the direct fixation is formed with these means, the wire-like transmission members 22 and the base material 30 are in the state of the direct fixation with those means. Specifically, for example, when the state of the direct fixation is formed with ultrasonic welding, the wire-like transmission members 22 and the base material 30 has the state of the direct fixation with ultrasonic welding. A part where the state of the direct fixation with heat is formed with welding (fixing part between the wire-like transmission members 22 and the base material 30) may be referred to as a welding part, and among this, a fixing part with ultrasonic welding may be referred to as an ultrasonic welding part, and fixing part with heating pressurizing welding may be referred to as a heating pressurizing welding part, for example.

In the case of the direct fixation, only the resin included in the covering of the wire-like transmission member 22 may be melted, or only the resin included in the base material 30 may be melted. The resin which has been melted in these cases is stuck on an outer surface of the resin on the other side, and a relatively clear interface may be formed in some cases. Further, in the case of the direct fixation, both the resin included in the covering of the wire-like transmission member 22 and the resin included in the base material 30 may be melted. In this case, there may be a case where both the resins are mixed and a clear interface is not formed. In particular, when the covering of the wire-like transmission members 22 and the base material 30 include compatible resin such as the same resin material, there may be a case where both the resins are mixed and a clear interface is not be formed.

As the base material 30 that is directly fixed to the wire-like transmission members 22, a material obtained by stacking a first sheet-like member and a second sheet-like member may be used. The first sheet-like member is suitable for the direct fixation with the wire-like transmission members 22 than the second sheet-like member. For example, the first sheet-like member is a material that is formed into a solid sheet-like shape by an isologous material of the covering of the wire-like transmission members 22. The first sheet-like member appears on the main surface 31 of the base material 30. The wire-like transmission members 22 are directly fixed tip the first sheet-like member. The second sheet-like member is a member having protection performance higher than that of the first sheet-like member. For example, the second sheet-like member is nonwoven fabrics. The second sheet-like member appears on the main surface 32 of the base material 30. Although in the base material 30 according to the present example, a layer of a metal sheet-like member is not stacked, a layer of a metal sheet-like member may be stacked.

The fixing member 50 includes a plate-like part 52 that is used for attachment to the flat wiring member 20, and a fixing part 56 that is fixed to a fixing target 80 of the flat wiring member 20. The fixing member 50 according to the present example is a molded item obtained by integrally molding the plate-like part 52 and the fixing part 56 with resin being used as a material.

The plate-like part 52 is formed into a plate-like shape elongated in one direction. The plate-like part 52 is attached to the base material 30. In the example illustrated in FIG. 1, the plate-like part 52 extends in a direction in which the plurality of wire-like transmission member's 22 are arrayed. Here, one end portion of the plate-like part 52 overlaps the extension piece 36, and another end portion thereof overlaps the extension piece 37. With the plate-like part 52 and the extension pieces 36 and 37 being respectively bundled by the bundling members 60, the plate-like part 52 is attached to the base material 30.

A main surface in the plate-like part 52 comes in surface contact with the base material 30. In the example illustrated in FIG. 1, a main surface 53 in the plate-like part 52, out of both main surfaces 53 and 54, comes in surface contact with the main surface 32 in the base material 30 out of both the main surfaces 31 and 32. In particular, in the example illustrated in FIG. 1, the main surface 53 in the plate-like part 52 entirely comes in surface contact with the main surface 32 in the base material 30.

The fixing part 56 is provided, so as to protrude from the main surface 54 in the plate-like part 52. The fixing part 56 fixes the flat wiring member 20 to the fixing target 80. The present example will be given based on the assumption that the fixing target 80 is a plate-like member 80, such as a panel. The fixing part 36 is formed so as to be capable of being engaged with a fixing hole 82 that is formed in the plate-like member 80. The fixing part 56 includes a pillar part 57 that is formed to protrude from the plate-like part 52, and a pair of engagement pieces 58 that is formed to protrude from a tip end portion of the pillar part 57 toward a lateral side and a base end side of the pillar part 57. On the base end side of the pair of engagement pieces 58, the pair of engagement pieces 58 is formed so that its interval gradually becomes wider toward its tip end side. Further, when the fixing part 56 is inserted into the fixing hole 82 and comes in contact with a circumferential edge portion of the fixing hole 82, the pair of engagement pieces 58 can be elastically deformed so that its interval is reduced by receiving a force from the circumferential edge portion of the fixing hole 82. After the tip end portion passes through the fixing hole 82, the pair of engagement pieces 58 is elastically restored, and is engaged with the circumferential edge portion of the fixing hole 82. With this, the fixing part 56 is in a state of being fixed to the fixing target 80.

It is only necessary that the shape of the fixing part 56 be formed into a shape according to the fixing target 80, and the shape is not limited to the shape described above. For example, when the fixing target includes a fixing piece formed into a plate-like shape, it is preferable that the fixing part be formed into a shape that allows the fixing piece to be inserted and engaged.

The bundling members 60 bundle the plate-like part 52 and the extension pieces 36 and 37. The bundling members 60 are wound around the plate-like part 52 and the extension pieces 36 and 37, at positions except for the part of the plate-like part 52 where the fixing part 56 is provided. In the example illustrated in FIG. 1, one end portion of the plate-like part 52 and the extension piece 36 are bundled by the bundling member 60. Further, another end portion of the plate-like part 52 and the extension piece 37 are bundled by the bundling member 60. A material for the bundling member 60 is not particularly limited as long as the material can bundle the plate-like part 52 and the extension pieces 36 and 37, and for example, an adhesive tape or the like can be used.

At the end portions of the plate-like part 52 in the longitudinal direction, projecting parts 55 are provided so as to protrude from the main surface 54. The bundling members 60 are provided further on the intermediate portion side of the plate-like part 52 than the part where the projecting parts 55 are provided. With this, when the bundling members 60 are about to move toward the outer side along the longitudinal direction of the plate-like part 52, the bundling members 60 come in contact with the projecting parts 55, which can prevent the bundling members 60 from corning off of the plate-like part 52.

According to the wiring member with a fixing member 10, the plate-like part 52 is attached to the base material 30 while the main surface 54 of the plate-like part 52 in the fixing member 50 comes in surface contact with the base material 30, and thus the flat wiring member 20 can maintain its spread state to the extent possible in a state in which the member 50 is attached. When the fixing member 50 is fixed to the fixing target 80 in this state, the flat wiring member 20 can maintain its spread state to the extent possible in a state of being fixed to the fixing target 80. Further, in the present example, in the flat wiring member 20, the base material 30 can be fixed to the target 80 in a state of facing the fixing target 80 side.

The plate-like part 52 extends in the direction in which the plurality of wire-like transmission members 22 are arrayed, and thus, owing to the plate-like part 52, the flat wiring member 20 can maintain its spread state to the extent possible in the direction in which the plurality of wire-like transmission members 22 are arrayed. The plate-like part 52 and the extension piece 36 are bundled by the bundling member 60, and thus the wire-like transmission members 22 can be prevented from being bundled by the bundling member 60 in a state in which the fixing member 50 is attached to the base material 30.

Second Embodiment

Figure 3:
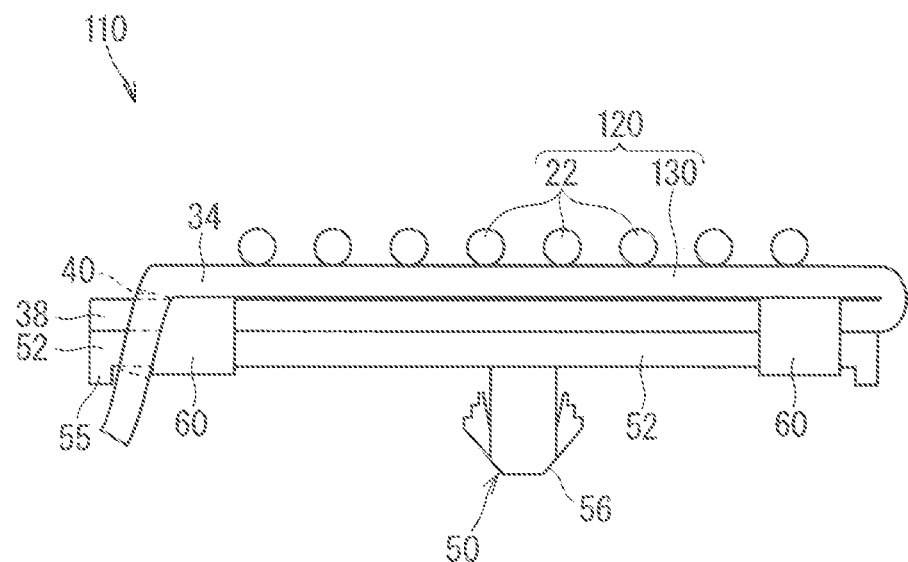
FIG. 3 is a front view illustrating a wiring member with a fixing member according to the second embodiment.
Figure 4:
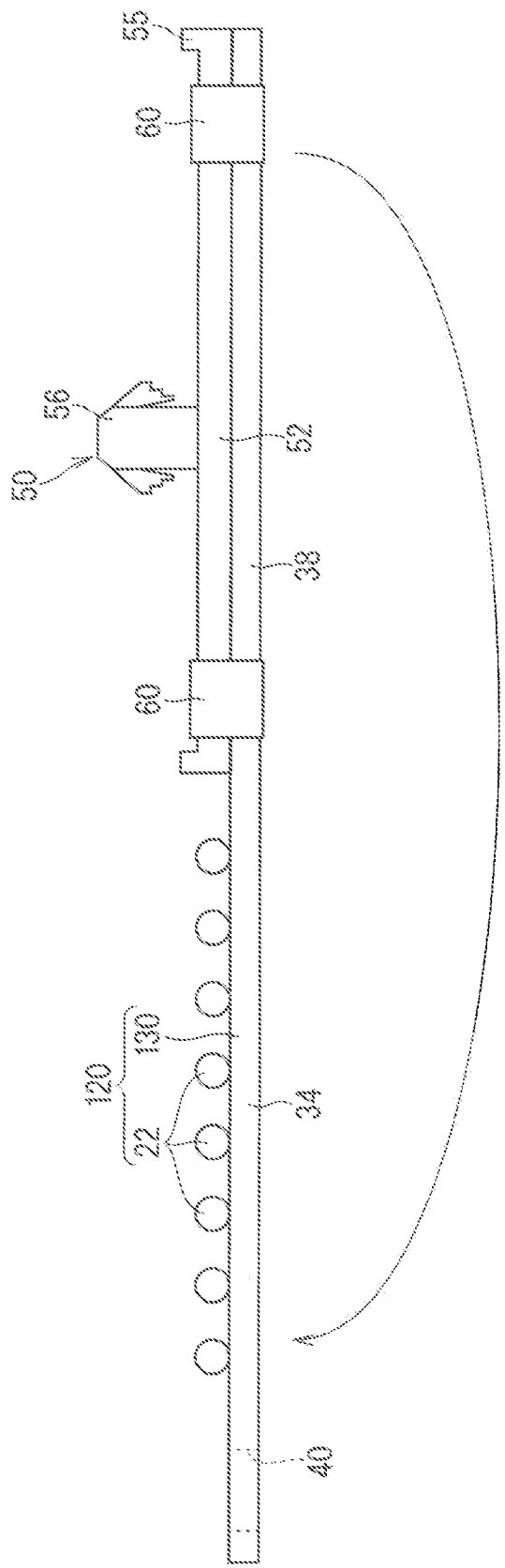
FIG. 4 is an explanatory diagram illustrating a state in which a base material is bent.

A wiring member with a fixing member according to the second embodiment will be described. FIG. 3 is a flout view illustrating a wiring member with a fixing member 110 according to the second embodiment. FIG. 4 is an explanatory diagram illustrating a state in which the base material 130 is bent. Note that constituent elements similar to those described above in the description of the present embodiment are denoted by the same reference signs, and description thereof will be omitted. The same applies to description of each of the following embodiments.

In the present example, the attachment mode between the fixing member 50 and a flat wiring member 120 is different from the attachment mode between the fixing member 50 and the flat wiring member 20 in the wiring member with a fixing member 10 according to the first embodiment.

A base material 130 according to the present example includes the body part 34 to which the plurality of wire-like transmission members 22 are fixed, and a folded piece 38 that extends from the body part 34 and to which the fixing member 50 is attached. The folded piece 38 is folded toward the body part 34 side together with the fixing member 50. In the present example, both the side parts interposing the fixing part 56 in the plate-like part 52 are respectively bundled together with the folded piece 38 by the bundling members 60. Thus, in the present example, an extension dimension of the folded piece 38 from the body part 34 is set to be equal to or larger than a length dimension from one end portion to the fixing part 56 in the plate-like part 52.

The folded piece 38 being folded maintains the folded state. Here, the folded piece 38 maintains the folded state by a through hole 40 formed in the body part 34. Specifically, the through hole 40 is formed at the edge portion of the body part 34, which is located on the side opposite to the folded piece 38. The through hole 40 is formed to be capable of penetrating the plate-like part 52. The through hole 40 is, for example, formed to be slightly larger than the width dimension of the plate-like part 52. The through hole 40 be a notch having no width, or may be a cutout having a width. With the plate-like part 52 penetrating the through hole 40 formed in the body part 34, the extension piece 36 maintains the folded state. Note that, in the example illustrated in FIG. 3, the plate-like part 52 as well as the tip end portion of the folded piece 38 penetrates the through hole 40. However, this configuration is not an essential configuration. Only the plate-like part 52 among the plate-like part 52 and the folded piece 38 may penetrate the through hole 40. It is preferable that the projecting part 55 be caught by the circumferential edge portion of the through hole 40 in a state in which the projecting part 55 in the plate-like part 52 penetrates the through hole 40. With this, the projecting part 55 functions as a return stopper. For example, it is considered that the width dimension of the through hole 40 (width dimension when the through hole 40 opens wide) is formed to be smaller than the thickness dimension of the part where the projecting part 55 is formed to the extent that the part where the projecting part 55 is formed can penetrate.

If the folded piece 38 is folded toward the body part 34 side together with the fixing member 50 as in the present example, the direction of the fixing part 56 can be changed. In the base material 130, the plate-like part 52 can also be fixed on the same main surface 31 as the main surface 31 to which die wire-like transmission members 22 are fixed. If the extension piece 36 is maintained in the folded state with the plate-like part 52 penetrating the through hole 40 formed in the body part 34, a member for maintaining the folded shape need not be separately provided.

Third Embodiment

Figure 5:
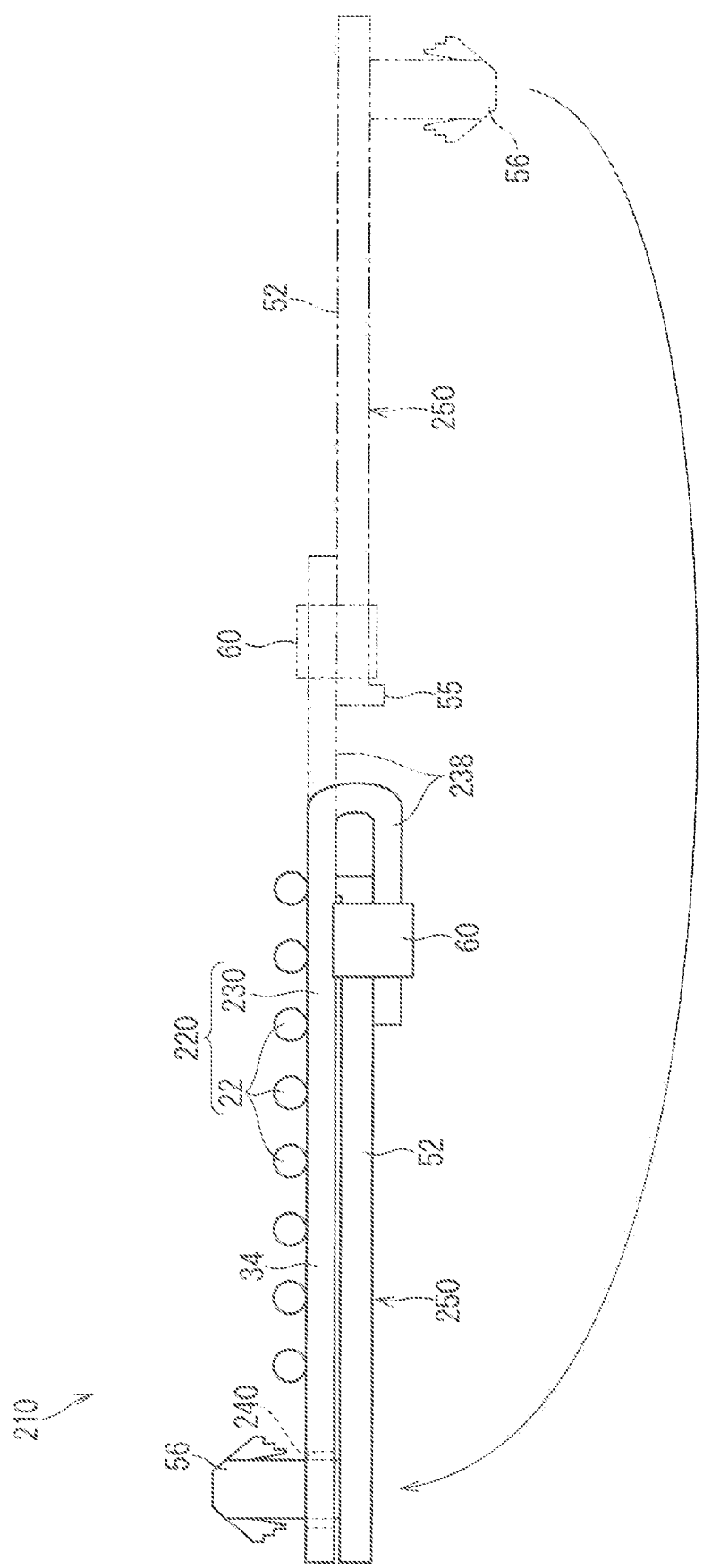
FIG. 5 is a front view illustrating a wiring member with a fixing member according to the third embodiment.

A wiring member with a fixing member according to the third embodiment will be described. FIG. 5 is a front view illustrating a wiring member with a fixing member 210 according to the third embodiment.

In the present example, the attachment mode between a fixing member 250 folded together with a folded piece 238 and a flat wiring member 220 is different from the attachment mode between the fixing member 50 and the flat wiring member 120 in the wiring member with a fixing member 110 according to the second embodiment.

Specifically, with the fixing part 56 penetrating a through hole 240 formed in the body part 34, the folded piece 238 maintains the folded state. In this case, it is preferable that the through hole 240 be formed smaller than the fixing part 56 to the extent that the pair of engagement pieces 58 in the fixing part 56 can penetrate. With this, the pair of engagement pieces 58 penetrating the through hole 240 can be caught by the circumferential edge portion of the through hole 240, thus being capable of functioning as a return stopper.

Further, in the present example, the fixing part 56 is provided at one end portion of the plate-like part 52 in the longitudinal direction. The extension dimension of the folded piece 238 from the body part 34 is set to be shorter than the dimension of the plate-like part 52 along the longitudinal direction. Further, only another end portion of the plate-like part 52 in the longitudinal direction is fixed to the folded piece 238.

In this manner, also when the folded piece 238 is maintained in the folded state with the fixing part 56 penetrating the through hole 240 formed in the body part 34, a member for maintaining the folded shape need not be separately provided. Further, in the present example, the fixing member 50 is provided on the wire-like transmission member 22 side with respect to a base material 230, and thus in the flat wiring member 220, fixing to the fixing target 80 is enabled in a state in Which the wire-like transmission members 22 face the fixing target 80 side.

Fourth Embodiment

Figure 6:
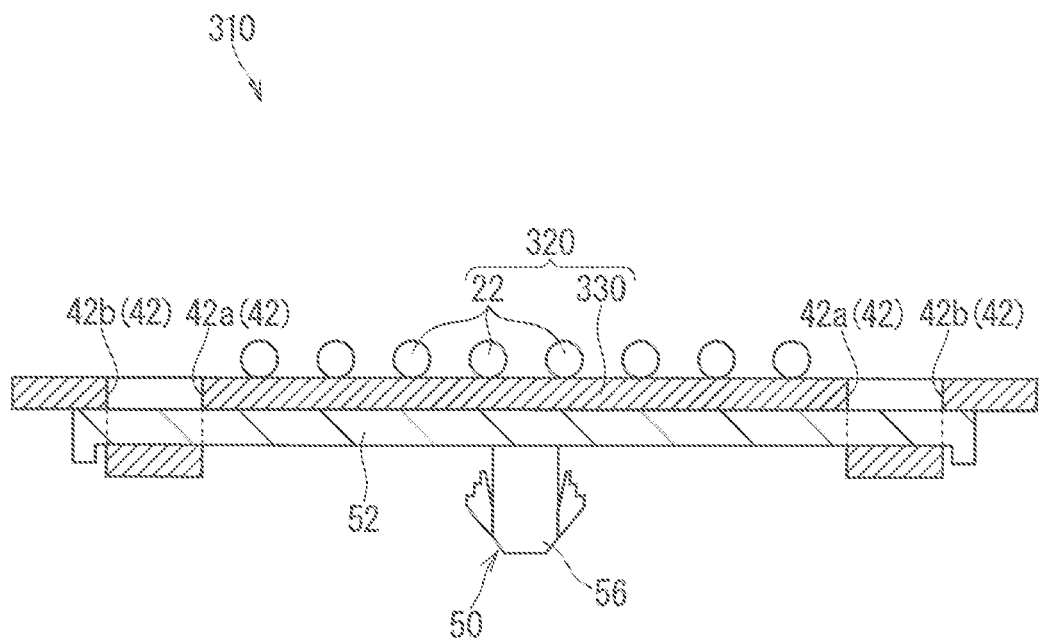
FIG. 6 is a front view illustrating a wiring member with a fixing member according to the fourth embodiment.

A wiring member with a fixing member according to the fourth embodiment will be described. FIG. 6 is a front view illustrating a wiring member with a fixing member 310 according to the fourth embodiment.

In the present example, the attachment mode between the fixing member 50 and a flat wiring member 320 is different from those in the examples described in the above. Specifically, the fixing member 50 is attached to a base material 330, with the plate-like part 52 being inserted into insertion holes 42 formed in the base material 330. The insertion hole 42 may be a notch having no width dimension, or may be a cutout having a width dimension.

In the present example, both the side parts interposing the fixing part 56 in the plate-like part 52 are respectively inserted into the insertion holes 42. Further, in order to fix one side part with respect to the fixing part 56, a plurality (two in the example illustrated in FIG. 6) of insertion holes 42 are provided. Such a plurality of insertion holes 42*a* and 42*b* are provided at a distance in the longitudinal direction of the plate-like part 52. The plate-like part 52 is inserted into the plurality of insertion holes 42*a* and 42*b* at one side part with respect to the fixing part 56. With this, a part of the base material 330 between the insertion holes 42*a* and 42*b* is in a state of being lifted in the thickness direction by the plate-like part 52 than the other circumferential edge portions of the insertion holes 42*a* and 42*b*. As a result, the base material 330 is in an elastically deformed state, and the plate-like part 52 is in a state of being pressed from the sides of both the main surfaces 53 and 54 by an elastically restoring force of the base material 330.

Note that, in the example illustrated in FIG. 6, the insertion holes 42 are provided at positions of the base material 330 except for the region where the wire-like transmission members 22 are fixed. Parts of the plate-like part 52 being inserted into the insertion holes 42 come in contact only with the base material 330 among the wire-like transmission members 22 and the base material 330. The insertion holes may be provided in a region where the wire-like transmission members 22 are fixed, such as a region of the base material 330 between the wire-like transmission members 22. In this case, the parts of the plate-like part 52 being inserted into the insertion holes may come in contact with the wire-like transmission members 22. For example, if a plurality of insertion holes are provided at one end portion of the plate-like part 52, a region where the wire-like transmission members 22 are fixed may be included between the plurality of insertion holes. In this case, the plate-like part 52 can be pressed with both of the wire-like transmission members 22 and the base material 330 between the plurality of insertion holes, and thus the plate-like part 52 can be more securely pressed.

If the plate-like part 52 is inserted into the insertion holes 42 formed in the base material 330 and the fixing member 50 is thereby attached to the base material 330 as in the present example, a state in which the plate-like part 52 is attached to the base material 330 while coming in surface contact with the base material 330 can be easily generated.

Fifth Embodiment

Figure 7:
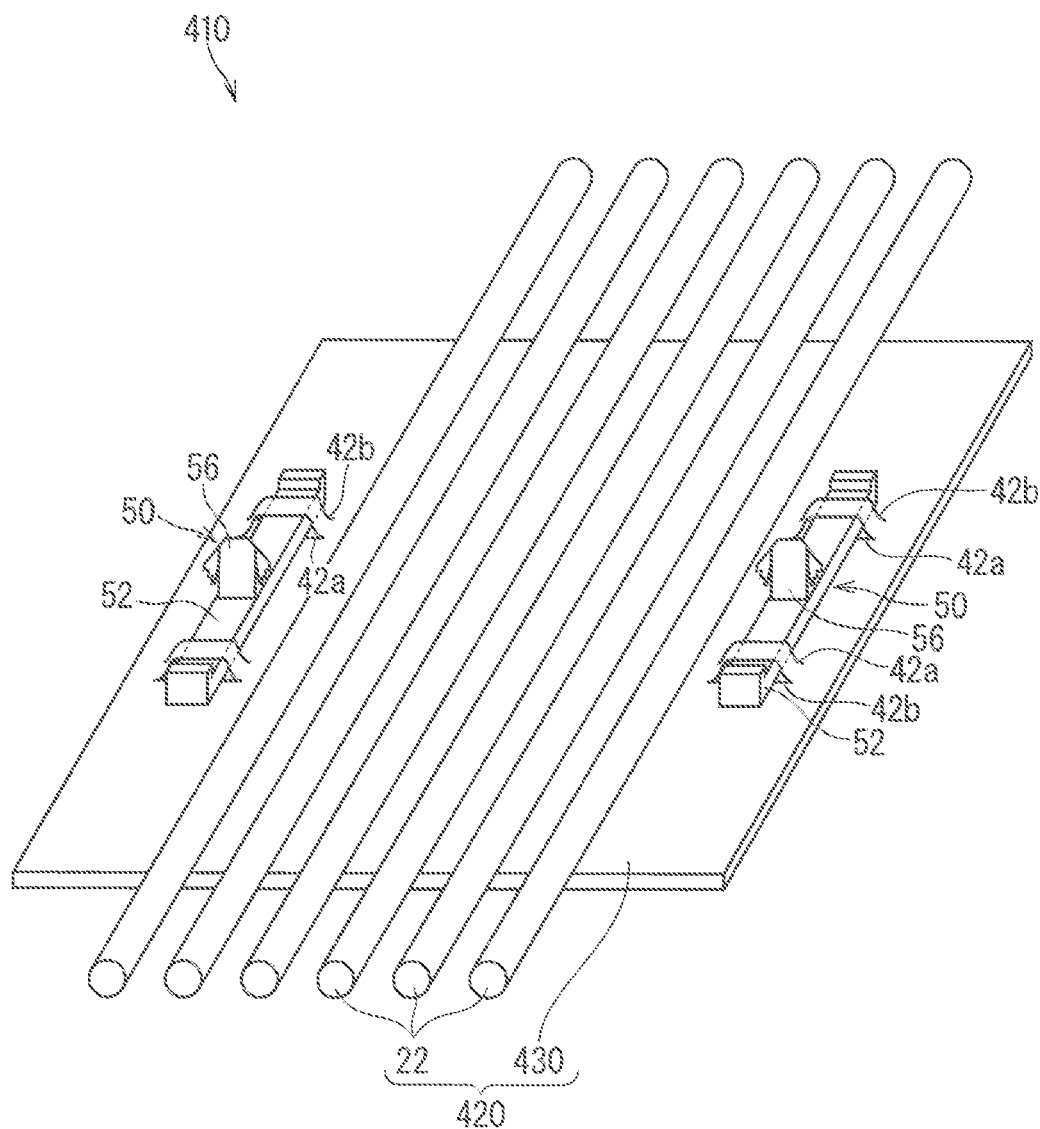
FIG. 7 is a perspective view illustrating a wiring member with a fixing member according to the fifth embodiment.

A wiring member with a fixing member according to the fifth embodiment will be described. FIG. 7 is a perspective view illustrating a wiring member with a fixing member 410 according to the fifth embodiment.

In the present example, the direction in which the plate-like part 52 extends is different from those in the examples described in the above. Specifically, in the present example, the fixing member is attached to a flat wiring member 420, so that the plate-like part 52 extends in the direction in which the plurality of wire-like transmission members 22 extend. In this case, owing to the plate-like part 52, the flat wiring member 20 can maintain its spread state to the extent possible in the direction in which the plurality of wire-like transmission members 22 extend.

In the example illustrated in FIG. 7, as the attachment mode between the fixing member 50 and the flat wiring member 420, the mode using the insertion holes 42 is adopted. Specifically, with the plate-like part 52 extending in the direction in which the wire-like transmission members 22 extend being inserted into the insertion holes 42 formed in a base material 430, the fixing member 50 is attached to the flat wiring member 420. As a matter of course, as the attachment mode between the fixing member 50 and the flat wiring member when the plate-like part 52 extends in the direction in which the plurality of wire-like transmission members 22 extend, the mode using the extension piece 36 may be adopted, or the mode using the folded piece 38 may be adopted.

In the example illustrated in FIG. 7, the fixing part 56 is provided to protrude on the side on which the wire-like transmission members 22 are fixed to the base material 430. However, the fixing part 56 may be provided to protrude on the side opposite to the side on which the wire-like transmission members 22 are fixed to the base material 430.

Sixth Embodiment

Figure 8:
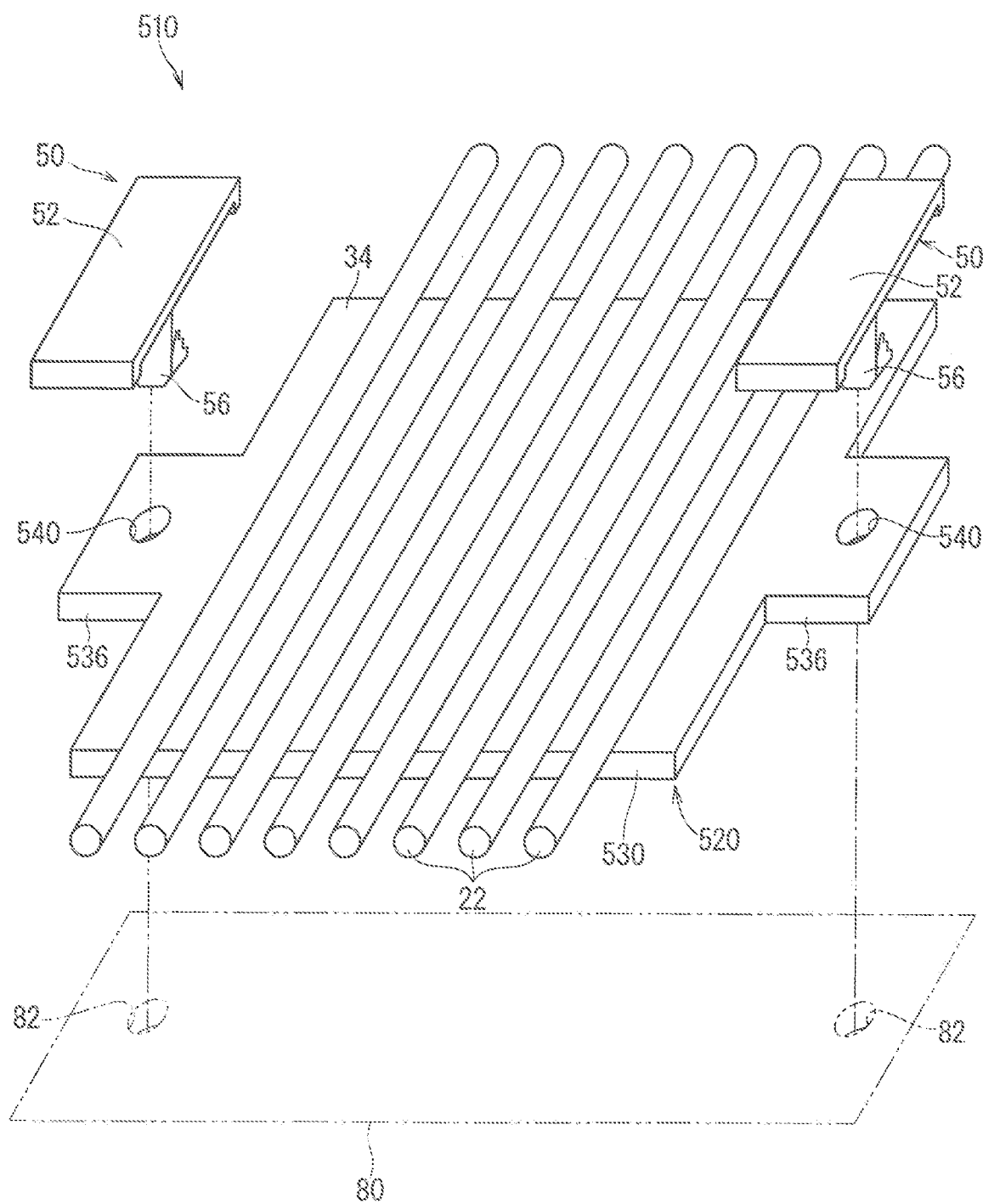
FIG. 8 is an exploded perspective view illustrating a fixing structure of the wiring member according to the sixth embodiment.
Figure 9:
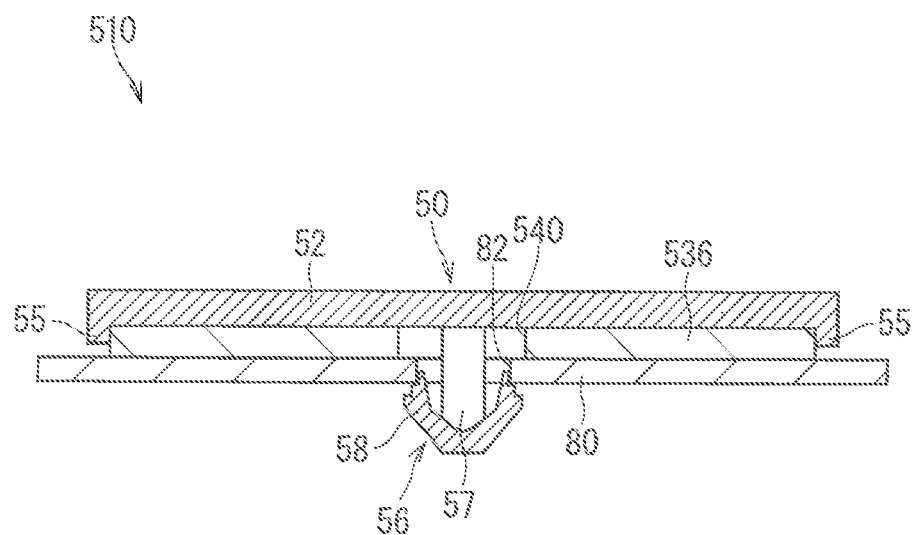
FIG. 9 is a schematic cross-sectional diagram illustrating a fixing structure of the wiring member according to the sixth embodiment.

A fixing structure of the wiring member according to the sixth embodiment will be described. FIG. 8 is an exploded perspective view illustrating a fixing structure 100 of the wiring member according to the sixth embodiment. FIG. 9 is a schematic cross-sectional diagram illustrating the fixing structure 100 of the wiring member according to the sixth embodiment.

In the fixing structure 100 of the wiring member according to the present example, the fixing member 50 is not attached to a flat wiring member 520 in a state before being fixed to the fixing target 80, and the flat wiring member 520 is fixed together when the fixing member 50 is fixed to the fixing target 80. Specifically, the fixing structure 100 of the wiring member includes the flat wiring member 520, the fixing target 80, and the fixing member 50. The shape of a base material 530 in the flat wiring member 520 is different from the shape of the base material 30 in the flat wiring member 20.

The base material 530 includes the body part 34, and an extension piece 536 that extends from the body part 34. A through hole 540 is formed in the extension piece 536. The extension piece 536 has a width dimension as large as or smaller than (here, slightly smaller than) the length dimension of the plate-like part 52, and extends from the body part 34.

The fixing part 56 is fixed to the fixing hole 82 formed in the fixing target 80 while penetrating the through hole 540 formed in the extension piece 536. The plate-like part 52 presses the extension piece 536 toward the fixing target 80 while coming in surface contact with the extension piece 536. For example, the through hole 540 may be formed to be as large as or larger than the pair of engagement pieces 58. In this case, the fixing part 56 penetrates the through hole 540, and if the fixing part 56 is not fixed to the fixing hole 82, the fixing part 56 easily comes off through the through hole 540. As a matter of course, the through hole 540 may be formed to be smaller than the pair of engagement pieces 58. In this case, the fixing part 56 is less liable to come off in a state of penetrating the through hole 540.

As in the present example, when the plate-like part 52 presses the base material 530 toward the fixing target 80 while coming in surface contact with the base material 530, the flat wiring member 20 can maintain its spread state to the extent possible in a state of being fixed to the fixing target

80. In this case, the fixing member 50 need not be attached to the flat wiring member 520 in advance, and in this case, the step of attaching the fixing member 50 to the flat wiring member 520 can be omitted.

To the fixing member 50 according to the present example, a wire-like member different from the wire-like transmission members 22 may be fixed. For example, the wire-like member may be fixed to the fixing member 50 by, for example, being bundled with the plate-like part 52 by the bundling member. Examples of the wire-like member may include an antenna cable, and a bundled wire-like transmission member group (electric wire bundle).

[Supplementary Note]

Examples of the flat wiring member may include a flexible flat cable that collectively covers around a plurality of wire-like conductors. Further, a part of the flat wiring member may be folded.

Note that each configuration described in each embodiment and each modification described above can be combined with each other as appropriate unless there is no inconsistency. For example, in each embodiment, each configuration can be combined with the fixing member 50 in which the fixing part 56 is provided at the intermediate portion of the plate-like part 52, the fixing member 250 in which the fixing part 56 is provided at the end portion of the plate-like part 52, and the like as appropriate. Further, in each embodiment, the direction of the fixing part 56 in the thickness direction of the flat wiring member, the longitudinal direction of the plate-like part with respect to the wire-like transmission members 22, and the like can also be combined with each other as appropriate.

EXPLANATION OF REFERENCE SIGNS

10, 110, 210, 310, 410 Wiring member with fixing member
20, 120, 220, 320, 420, 520 Flat wiring member
22 Wire-like transmission member
30, 130, 230, 330, 430, 530 Base material
31, 32 Main surface
34 Body part
36, 37 Extension piece
38, 238 Folded piece
40, 240, 540 Through hole
42 Insertion hole
50, 250 Fixing member
52 Plate-like part
53, 54 Main surface
55 Projecting part
56 Fixing part
57 Pillar part
58 Engagement piece
60 Bundling member
80 Fixing target
82 Fixing hole
100 Fixing structure of wiring member

The invention claimed is:

1. A wiring member with a fixing member, comprising:
a flat wiring member; and
a fixing member, wherein
the flat wiring member includes a plurality of wire-like transmission members and a base material,
the plurality of wire-like transmission members are fixed to the base material in an arrayed state,
the fixing member includes a plate-like part and a fixing part,
the plate-like part is formed into a flat plate-like shape elongated in one direction, and the plate-like part is attached to the base material while a main surface of the plate-like part comes in surface contact with the base material,
the fixing part is a part being provided to project on the plate-like part and being configured to fix the flat wiring member to a fixing target,
the wiring member with the fixing member further comprises a bundling member,
the base material includes a body part, and an extension piece extending from the body part,
the plurality of wire-like transmission members are fixed to the body part, and
the plate-like part and the extension piece are bundled by the bundling member.

2. A wiring member with a fixing member, comprising:
a flat wiring member; and
a fixing member, wherein
the flat wiring member includes a plurality of wire-like transmission members and a base material,
the plurality of wire-like transmission members are fixed to the base material in an arrayed state,
the fixing member includes a plate-like part and a fixing part,
the plate-like part is formed into a flat plate-like shape elongated in one direction, and the plate-like part is attached to the base material while a main surface of the plate-like part comes in surface contact with the base material,
the fixing part is a part being provided to project on the plate-like part and being configured to fix the flat wiring member to a fixing target,
the base material includes a body part, and a folded piece extending from the body part,
the plurality of wire-like transmission members are fixed to the body part,
the fixing member is attached to the folded piece,
the folded piece is folded toward a side of the body part together with the fixing member, and
the folded piece is maintained in a folded state with the plate-like part penetrating a through hole formed in the body part.

3. The wiring member with a fixing member according to claim 2, wherein
the folded piece is maintained in the folded state with the fixing part penetrating the through hole formed in the body part.

4. A fixing structure of a wiring member, comprising:
a flat wiring member;
a fixing target; and
a fixing member, wherein
the flat wiring member includes a plurality of wire-like transmission members and a base material,
the plurality of wire-like transmission members are fixed to the base material in an arrayed state,
the fixing member includes a fixing part and a plate-like part,
the fixing part is fixed to a fixing hole formed in the fixing target while penetrating a through hole formed in the base material, and
the plate-like part is formed into a flat plate-like shape elongated in one direction in a manner of spreading from a base end portion of the fixing part, and presses the base material toward the fixing target while coming in surface contact with the base material, and a projecting part is provided on each end of the plate-like part in a longitudinal direction, and the projecting parts protrude toward a side of the base material.

* * * * *